US010361845B2

United States Patent
Miller et al.

(10) Patent No.: US 10,361,845 B2
(45) Date of Patent: *Jul. 23, 2019

(54) SYSTEMS AND METHODS SECURING AN AUTONOMOUS DEVICE

(71) Applicant: SWFL, Inc., Reno, NV (US)

(72) Inventors: Jeremie Miller, Reno, NV (US); Thomas Muldowney, Reno, NV (US); Allison Clift-Jennings, Reno, NV (US)

(73) Assignee: SWFL, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,933

(22) Filed: Oct. 19, 2018

(65) Prior Publication Data

US 2019/0058584 A1 Feb. 21, 2019

Related U.S. Application Data

(63) Continuation of application No. 15/982,885, filed on May 17, 2018, now Pat. No. 10,211,979.

(Continued)

(51) Int. Cl.
*H04L 9/08* (2006.01)
*H04L 9/32* (2006.01)
(Continued)

(52) U.S. Cl.
CPC ......... *H04L 9/0822* (2013.01); *G06F 21/572* (2013.01); *G06F 21/72* (2013.01);
(Continued)

(58) Field of Classification Search
CPC ..................................................... H04L 9/0822
(Continued)

(56) References Cited

U.S. PATENT DOCUMENTS 8,874,896 B2 * 10/2014 Boccon-Gibod ... G06F 21/6218
380/281
9,049,010 B2 * 6/2015 Jueneman ............... G06F 21/32
(Continued)

OTHER PUBLICATIONS

FOUMARIS, et al., "A Secure Docking Module for providing trust in Crisis Management incidents", 2013 IEEE International Conference on Industrial Informatics (INDIN) (pp. 804-809) (Year: 2013), Jul. 1, 2013.

(Continued)

*Primary Examiner* — Khalil Naghdali
(74) *Attorney, Agent, or Firm* — Jeffrey Schox; Padowithz Alce (57) ABSTRACT

A system and method for cryptographically securing a device includes initializing a cryptographic processing circuit which includes provisioning a cryptographic key store associated with the cryptographic processing circuit with cryptographic key material; and establishing a first cryptographically secured connection between a main central processing unit of the autonomous device and the cryptographic processing circuit of the device; and implementing a cryptographic validation of resident firmware of the main central processing unit by validating a cryptographic digital signature ascribed to the resident firmware against an up-to-date cryptographic digital signature used for installing and/or updating the resident firmware of the main central processing circuit.

19 Claims, 3 Drawing Sheets

Related U.S. Application Data (60) Provisional application No. 62/508,903, filed on May 19, 2017.

(51) Int. Cl.
  *G06F 21/79* (2013.01)
  *G06F 21/72* (2013.01)
  *G06F 21/57* (2013.01)

(52) U.S. Cl.
  CPC ............ *G06F 21/79* (2013.01); *H04L 9/0861* (2013.01); *H04L 9/3247* (2013.01); *H04L 9/3271* (2013.01)

(58) Field of Classification Search
  USPC .......................................................... 380/281
  See application file for complete search history.

(56) References Cited

U.S. PATENT DOCUMENTS

| | | | | |
|---|---|---|---|---|
| 9,426,127 | B2* | 8/2016 | Huxham | H04L 63/0428 |
| 9,674,162 | B1* | 6/2017 | Miller | H04L 63/0435 |
| 9,767,318 | B1* | 9/2017 | Dropps | G06F 21/72 |
| 9,860,749 | B2* | 1/2018 | Huxham | G06F 12/1408 |
| 2011/0161672 | A1 | 6/2011 | Martinez et al. | |
| 2015/0082420 | A1* | 3/2015 | Love | G06F 21/6218 726/16 |
| 2016/0019050 | A1 | 1/2016 | Marr et al. | |
| 2016/0359636 | A1 | 12/2016 | Kreft | |
| 2017/0041296 | A1* | 2/2017 | Ford | H04L 63/0421 |
| 2017/0232300 | A1* | 8/2017 | Tran | H04L 67/12 434/247 |
| 2017/0357936 | A1* | 12/2017 | Byington | G06Q 10/087 |
| 2017/0366359 | A1* | 12/2017 | Scarlata | H04L 9/0816 |
| 2018/0089434 | A1* | 3/2018 | Sibert | H04L 63/107 |

OTHER PUBLICATIONS

Foumaris, Apostolos P, "Hardware Module Design for Ensuring Trust", IEEE Annual Symposium on VLSI; 2010, IEEE Computer Society Annual Symposium on VLSI (pp. 155-160). (Year: 2010), Jul. 1, 2010.

International Search Report and the Written Opinion of the International Searching Authority, Application No. PCT/US18/33256, filed May 17, 2018.

* cited by examiner

Provisioning Key Material to Crypto Chip  S210

Establishing Strong Crypto Connection Between Crypto Chip and MCU S220
Connecting Crypto Chip to MCU Firmware S221
Generating New Crypto Keys Using Secret S222

Transitioning Management Control of PCBA S230

Cryptographically Validating and Installing Prime Contract S240
Provisioning MCU with Test Jig S241

SYSTEMS AND METHODS SECURING AN AUTONOMOUS DEVICE

CROSS-REFERENCE TO RELATED APPLICATIONS

This application is a continuation of U.S. application Ser. No. 15/982,885, filed 17 May 2018, which claims the benefit of U.S. Provisional Application No. 62/508,903, filed 19 May 2017, which are both incorporated in their entireties by this reference.

TECHNICAL FIELD

The inventions of the present application relate generally to the electronic connectivity, security and communications fields, and more specifically to improved systems and methods for implementing secure and private connectivity and communications within and between devices.

BACKGROUND

In many centralized systems, many devices across great and small distances can achieve heightened levels of connectivity and interaction without being physically connected to each other and thus, are able to connect and communicate with one another wirelessly. These centralized systems for connecting these devices, however, are accompanied with several disadvantages that limit connectivity in remote locations, limit the autonomy of the devices operating in the centralized systems, and therefore, do not allow for optimal connectivity, autonomous transacting, and communications between and through the devices.

Additionally, due to the inherent lure of abuse and exploitation by centralized systems, all of these economic elements, digital and physical, with existing systems or new products, must be fundamentally autonomous and distributed in nature in order to maximize their potential. It is in autonomous and distributed environments that markets can naturally emerge, balancing and maximizing benefit for all those involved.

The commonly referred to proposal to evolve the Internet to optimize for the "Internet of Things" has become synonymous with connected thermostats, pet collars, and toothbrushes. While the ability to build connectivity between devices like these is novel, there is a possibility that it may not realize the full potential of digitally connecting the physical world of things together. When a device can only connect with similarly-manufactured devices, and each of them can only connect with their manufacturer-approved cloud service, the vast majority of value that the device could have provided over its lifetime is severely hindered since it is strictly tied to a cloud-based interaction platform.

These new economic actors—i.e., the devices themselves-must be principal actors independent from centralized authority (e.g., manufacturers and connectivity servers) to unlock the vast majority of value associated therewith. Including—and especially—from the manufacturers of the devices themselves. It can be a very risky proposition to continue to give central authority, whether a nation state or a corporation, the reach and control over this new type of connected device. These autonomous and fully interconnected devices should retain full control and complete privacy at the device providing the coupling and creating the economic value.

But in order to realize such prospective technical environments where devices are independent actors, the technical functions involved in operating an autonomous device including the operations of any cryptography element and operations of a main central processing unit must be made secure from attackers to allow for connectivity including discovery, interacting, and even transacting value between devices and with people. The need for strong security applies to the entire protocol stack, systems, and methods governing these technical functions. Thus, there is a need in the device security, connectivity and communication field to create new and useful systems and methods for producing devices that are secure all the way from the circuit board through the device firmware to the applications that are run on the device. In this way, the device may be able to implement a secure environment for interactivity of autonomous devices without or independent of a central authority for governing interaction there between and consequently, enhancing the levels and quality of connectivity and contractual interactions achievable with such networks and devices.

SUMMARY OF THE INVENTION

In one embodiment, a system for cryptographically securing an autonomous device comprises: an autonomous device that comprises: a main central processing circuit; a cryptographic processing circuit and an associated secured cryptographic key store, wherein the cryptographic processing circuit establishes a cryptographically secured connection between the main central processing circuit and the cryptographic processing circuit; and a flash memory comprising an encrypted file system; a first provisioning source comprising a first provisioning computer that: initializes the cryptographic processing circuit by provisioning the cryptographic key store associated with the cryptographic processing circuit with cryptographic key material; and provisions the main central processing circuit with cryptographically signed and encrypted resident firmware.

In one embodiment, the system includes a second provisioning source comprising a second provisioning computer that provisions the main central processing circuit with primary operating instructions only after the main processing unit cryptographically validates an authority of the second provision computer to provision the main central processing circuit.

In one embodiment of the system, the main central processing circuit implements a cryptographic validation of the resident firmware by validating a cryptographic digital signature ascribed to the resident firmware against an up-to-date cryptographic digital signature used for installing and/or updating the resident firmware of the main central processing circuit.

In one embodiment of the system, establishing the cryptographically secured connection includes: at the main central processing circuit, receiving a secure pairing request from the cryptographic processing circuit; in response to receiving the secure pairing request, providing a cryptographically signed response to the cryptographic processing circuit; at the cryptographic processing circuit, validating the cryptographically signed response based on a cryptographic key derived from a master cryptographic key used to initialize the cryptographic processing circuit.

In one embodiment, a method for cryptographically securing an autonomous device includes initializing a cryptographic processing circuit includes provisioning a cryptographic key store associated with the cryptographic processing circuit of the autonomous device with cryptographic key material; establishing a first cryptographically secured connection between a main central processing unit of the autonomous device and the cryptographic processing circuit of the autonomous device; and implementing a cryptographic validation of resident firmware of the main central processing unit by validating a cryptographic digital signature ascribed to the resident firmware against an up-to-date cryptographic digital signature used for installing and/or updating the resident firmware of the main central processing circuit.

In one embodiment, the method includes establishing the first cryptographically secured pairing includes: at the main central processing unit, receiving a secure pairing request; in response to receiving the secure pairing request, providing a cryptographically signed response to the cryptographic processing circuit; at the cryptographic processing circuit, validating the cryptographically signed response based on a cryptographic key derived from a master cryptographic key used to initialize the cryptographic processing circuit.

In one embodiment, the method includes if the cryptographic processing circuit successfully validates the cryptographically signed response from the main central processing unit, initiating an encrypted cryptographic key exchange, wherein the encrypted cryptographic key exchange includes: using the cryptographic key material to generate at the cryptographic processing circuit an asymmetric cryptographic key pair comprising a private/public cryptographic key pair; and transmitting from the cryptographic processing circuit to the main central processing unit a public cryptographic key of the private/public cryptographic key pair.

In one embodiment, the method includes at the main central processing unit, the public cryptographic key is used to communicate with and/or control of operations of the cryptographic processing circuit.

In one embodiment, the method includes provisioning the main central processing unit with the resident firmware, wherein the provisioning of the main central processing unit includes establishing a second cryptographically secured binding between the main central processing unit and the resident firmware that includes: installing the resident firmware on the main central processing unit; cryptographically signing the resident firmware with a protected cryptographic signing key; and encrypting the resident firmware with a cryptographic key that is distinct from the cryptographic signing key.

In one embodiment, the method includes generating by the main central processing unit an encrypted file system on a flash memory of the autonomous device, wherein the encrypted file system operates to encrypt data stored on the flash memory that is at rest.

In one embodiment, the method includes disabling debugger access to the main central processing unit.

In one embodiment, the method includes provisioning the cryptographic key store associated with the cryptographic processing circuit is performed by a first provisioning source comprising a first provisioning computer, the provisioning the cryptographic key store includes using a master cryptographic key that controls an access and/or an operation of the cryptographic chip.

In one embodiment, a master cryptographic key comprises a single-purpose cryptographic key, where the single-purpose cryptographic key operates to initialize and/or boot the cryptographic processing circuit.

In one embodiment, the master cryptographic key comprises a limited-purpose cryptographic key, where the limited-purpose cryptographic key operates to: (i) initialize and/or boot the cryptographic processing circuit and (ii) implement the cryptographic validation of the resident firmware of the main central processing unit.

In one embodiment, a provisioning of the main central processing unit is performed by the first provisioning source.

In one embodiment, the method includes establishing a third cryptographically secured binding between the main central processing unit and primary operating instructions that includes: cryptographically validating and installing the primary operating instructions onto the main central processing unit, wherein the primary operating instructions comprise a prime smart contract between the first provisioning source and a second provisioning source.

In one embodiment, the method includes cryptographically validating and installing the primary operation instructions on the main central processing unit which includes: prior to installing the primary operating instructions, cryptographically validating by the main central processing unit an authority of a second provisioning computer of a second provisioning source to provision the main central processing unit, wherein the cryptographic validation includes validating a cryptographic signature provided by the second provisioning computer.

In one embodiment, the method includes transitioning management control of the autonomous device from a first provisioning source to a second provisioning source by generating a second master cryptographic key for the second provisioning source using the master cryptographic key of the first provisioning source.

In one embodiment, a device security method that cryptographically secures a device includes: implementing a first cryptographic binding step of: at a physically secure location, using a master cryptographic key by a first provisioning source recognized by a cryptographic processing circuit to initialize the cryptographic processing circuit by provisioning a cryptographic key store associated with the cryptographic processing circuit of the device with cryptographic key material; implementing a second cryptographic binding step: establishing a first cryptographically secured pairing between a main central processing unit of the device and the cryptographic processing circuit of the device by exclusively exchanging one or more cryptographic keys between the cryptographic processing circuit and the main central processing unit; implementing a third cryptographic binding step: establishing a second cryptographically secured pairing between the main central processing unit and resident firmware of the main central processing unit by cryptographically validating by the main central processing unit a cryptographic signature ascribed to the resident firmware; and implementing a fourth cryptographic binding step: generating by the first provisioning source a second master cryptographic key for a second provisioning source based on a master cryptographic key of the first provisioning source.

In one embodiment, the device security method includes providing to the second provisioning source the second master cryptographic key for provisioning the main central processing unit of the device; and in response to providing the second master cryptographic key, disabling the first master cryptographic key.

DESCRIPTION OF THE PREFERRED EMBODIMENTS

The following description of the preferred embodiments of the present application invention are not intended to limit the inventions described herein to these preferred embodiments, but rather to enable any person skilled in the art to make and use the inventions.

Overview

Embodiments of the present application provide a foundation for future technological evolution by connecting autonomous physical objects to an Internet economy. However, in order to unlock the higher potential of the Internet of Things (IoT), strong privacy and security safeguards for these physical objects become essential at every layer of the networks that connect these autonomous physical objects and every communication point within the circuitry that operates these physical objects. These strong privacy and security safeguards include innovations and improvements in physical hardware, communication protocols, data analytics, and end user applications.

The Internet Security Glossary (Shirey, 2007) ("ISG") defines security as "[a] system condition in which system resources are free from unauthorized or accidental change, destruction, or loss." The embodiments of the present application provide autonomous device security techniques and protocols that allow for security, as defined by ISG and industry best practices, such that the autonomous devices of the present application can withstand sophisticated, well-resourced attacks through qualities such as penetration resistance, trustworthiness, and resilience. In this regard, the autonomous devices secured in this manner, as described in the embodiments of the present application, will provide a secure and reliable basis for mission-critical operations and systems, such as industrial infrastructure, for example.

1. A System Cryptographically Securing an Autonomous Device

Figure 1:
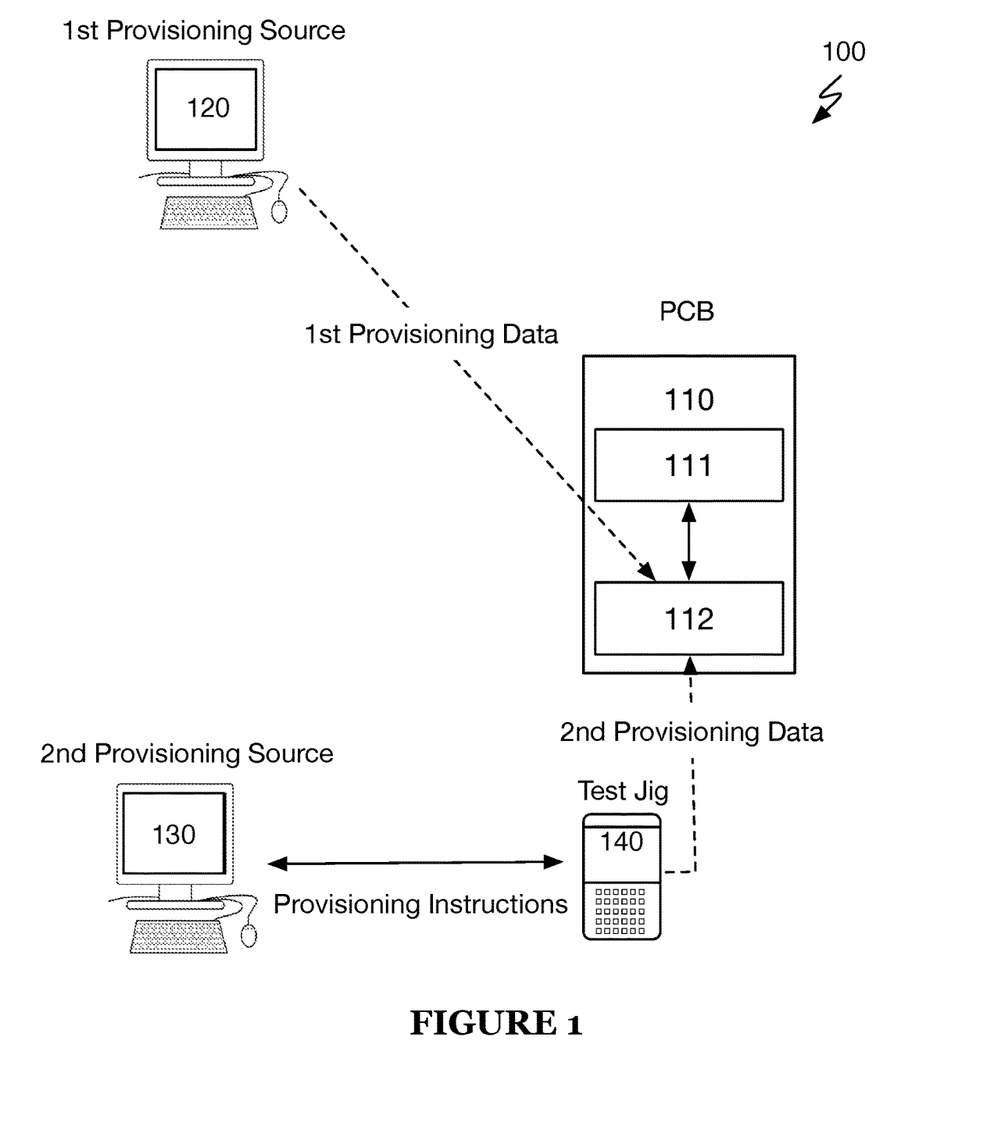
FIG. 1 illustrates an example system environment in accordance with some embodiments of the present application.

As shown in FIG. 1, the system 100 for producing a secure autonomous device using a cryptographic key chain (crypto chain) technique includes a printed circuit board assembly (PCBA) 110 having a microcontroller unit (MCU) 111 and a cryptographic processing chip (crypto chip) 112, a first provisioning source 120, a second provisioning source 130, and testing (provisioning) computer 140. As shown in more detail in FIG. 3, the PCBA 110 may also include a flash memory 113, a long-range radio communication chip 114, a Bluetooth low-energy chip 115, and a random number generator (RNG) 116.

Preferably, the system 100 functions to form a secure autonomous device by implementing a cryptographic chain of custody that secures several of the primary processing and operational components of the printed circuit board assembly of the autonomous device, during manufacture. In a preferred embodiment, at creation or manufacture, the autonomous device may be imprinted with public cryptographic keying material that may be used for signing, encryption, pairing, unlocking, and identity of one or more components of the device. In several of the embodiments, described here, this initial imprinting enables the cryptographic chain of custody described herein by enabling, at least, a crypto chip and an MCU of the device to pair by recognizing each using the initial public keying material, for the MCU to cryptographically validate resident firmware (e.g., by comparing a crypto signature ascribed to the resident firmware against a public key of the initial public keying material, etc.), and the like. The cryptographic chain of custody for the autonomous device enhances security of the autonomous device at the most basic hardware and software levels of the device, namely at the circuit board of the autonomous device, well in advance of operational use (e.g., field deployment) of the autonomous device. The cryptographic chain of custody may extend from the cryptographic processor 112 to the microcontroller unit 111 and all the way up to any software applications and computer-executable instructions provisioned to and/or run by the autonomous device. That is, the system 100 cryptographically secures the autonomous device at the hardware stack through the software stack operating on and/or with the autonomous device. In this way, to interact with any component and/or software application along the cryptographic chain of the autonomous device, all of the links of the cryptographic chain leading up to the hardware or software component must be established, maintained and/or validated against the cryptographic chip of the autonomous device. The cryptographic chain may be extensible beyond the manufacturing and initial provisioning of cryptographic key material, basic software applications, and instructions to end user provisioning and ultimately, during field use of the autonomous device. For instance, in the continued communication of the autonomous device with one or more disparate autonomous devices or the like, the communications and/or or interactions between the devices may be cryptographically secured, as described in U.S. patent application Ser. No. 15/345,392, which is incorporated by reference in its entirety.

Additionally, at the time of manufacture or construction, a cryptographic chip 112 may be paired through a crypto key exchange process with an MCU 111 on a printed circuit board assembly 110 to form a strong cryptographic binding so that the MCU 111 is limited to communicating only with its paired cryptographic chip 112, in some embodiments. The crypto key exchange may include any key exchange scheme described herein as well as key exchange schemes described in U.S. patent application Ser. No. 15/345,392, which is incorporated by reference in its entirety. This pairing of the MCU 111 and crypto chip 112 securely envelopes the communication and connectivity circle between the MCU 111 and crypto chip 112 to exclude and/or prevent unauthorized interactions from other components (including components on the printed circuit board assembly) and/or unauthorized parties from participating in the connection and/or communication circle of the MCU 111 and crypto chip 112. Thus, the pairing of the MCU 111 and crypto chip 112 provides a foundation for securely booting the MCU, as access to both the MCU 111 and crypto chip 112 will be necessary to successfully boot the MCU because booting authority must be validated against key material associated with the crypto chip 112.

In addition to access to the crypto chip 112, a second requirement for booting the MCU 111 may be a cryptographic check (crypto check) of the resident firmware of the MCU 111 to ensure that the cryptographic signature digitally signed to the resident firmware matches a last known good or valid version of the cryptographic signature of a cryptographic key associated with the crypto chip 112, a provisioning source, or the like. Performing the crypto check of the resident firmware helps to avoid attacks involving a downgrade to a prior (and potentially less secure) or different version of the firmware, as well as attempts to manipulate the resident firmware stored in an on-board flash memory or the like within MCU 111.

Within the system 100, several additional security measures may be implemented to further secure device operations. As a first security measure, in some embodiments, MCU 111 requires that all firmware updates and/or modifications are cryptographically signed with a protected cryptographic signing key to ensure that only firmware and/or firmware updates produced or provided by the first provisioning source or a valid provisioning source can be loaded onto the autonomous device. Optionally, firmware made available for distribution to a particular customer's devices can also be cryptographically co-signed by the customer for added security and control (e.g., requirement of multiple, disparate signatures for any modification operations to the device). Thus, in such embodiments, MCU 111 may be configured to present a challenge request for proof of the appropriate cryptographic signing key before any updates to the firmware may be performed and only with proof or presentation of valid cryptographic keys can a prospective provisioner manipulate firmware of the MCU 111 and/or any other protected component of the system 100 (i.e., device). Additionally, or alternatively, the MCU 111 may be configured to receive the appropriate cryptographic signing key together with a request to update the firmware thereby obviating a need for the challenge unless the cryptographic signing key provided is incorrect.

A second security measure may involve additionally encrypting the firmware per se and/or firmware data including the firmware identity (e.g., a hashname) and/or version identifier with a separate cryptographic key from the cryptographic signing key required for updates to prevent attackers from determining the exact firmware being deployed to an autonomous device. As a third security measure, MCU 111 may generate an encrypted file system on a flash memory or any suitable memory so that sensitive data stored thereon, such as data associated with the operations of the firmware, are encrypted "at rest" (e.g., before the data is communicated over a network) on the autonomous device. The sensitive data may also include the autonomous device's initialization script, radio configuration, list of current communication parameters, any temporary sensor data, and basically any data that can be extracted or determined from the autonomous device and the like.

Figure 3:
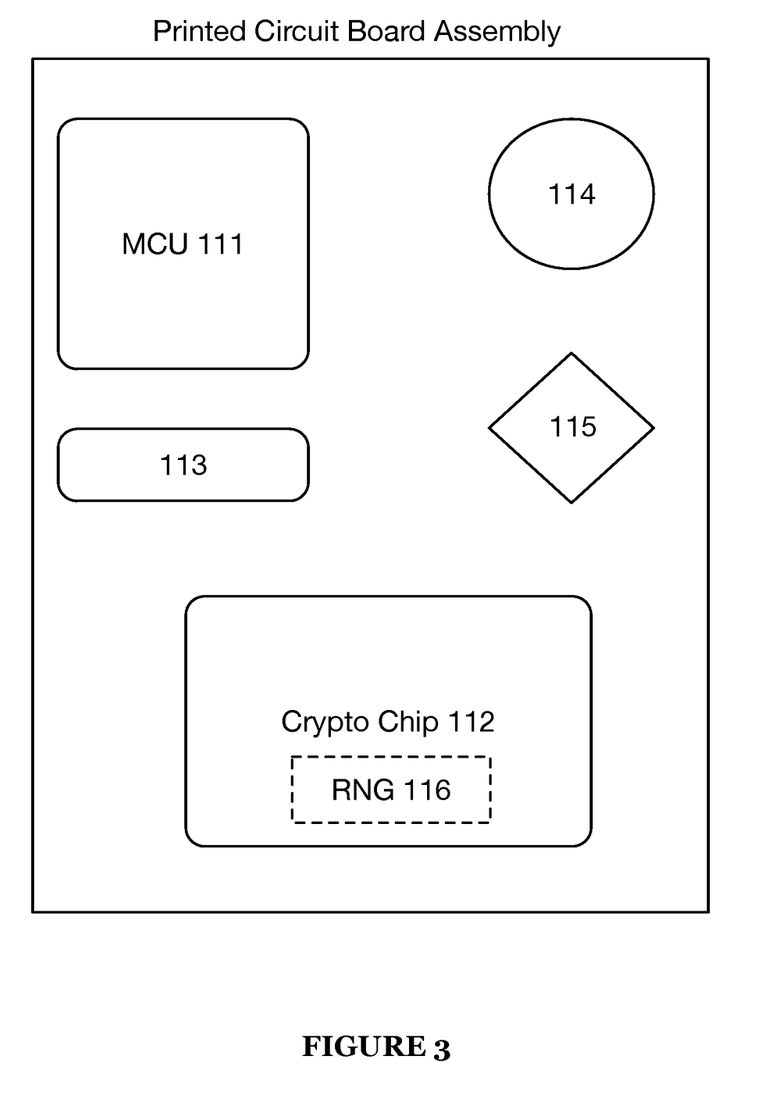
FIG. 3 illustrates an example of a more detailed printed circuit board assembly of FIG. 1.

The crypto chip 112 preferably and/or additionally uses random number generators (RNGs) 116 or pseudo-random number generators (PRNGs) and a strong crypto key derivation function called HMAC-based key derivation function (HKDF) in the cryptographic key generation process. Thus, if the autonomous device includes a hardware RNG, the crypto chip 112 preferably uses this RNG 116, but may additionally or alternatively use any suitable RNG or PRNG 116. If the autonomous device does not have a dedicated RNG but is capable of providing potential RNG sources (e.g., radio noise, thermal noise), the crypto chip 112 preferably uses the RNG sources to generate random numbers for the crypto key generation process. The crypto chip 112 may perform any suitable signal processing on RNG sources to extract random numbers, including the use of randomness extractors. If the autonomous device does not have access to RNG sources, the crypto chip 112 preferably produces pseudo-random numbers using a PRNG.

Additionally, during provisioning the crypto chip 112 is preferably operably connected to and/or in operable communication with a dedicated and secured cryptographic key store. The key store may be a tamper protected data storage, such as a hardware security module (HSM) or the like. Many of the crypto keys are stored in a dedicated storage location (e.g., a storage location intended for key storage), but additionally, or alternatively, crypto keys may be stored in other storage locations (e.g., inside a memory of an MCU or the like). Thus, it is possible that crypto keys may be stored in a same location (e.g., a key store of an HSM) or in different (distributed) locations on a device or system 100.

2. A Method for Cryptographically Securing an Autonomous Device

Figure 2:
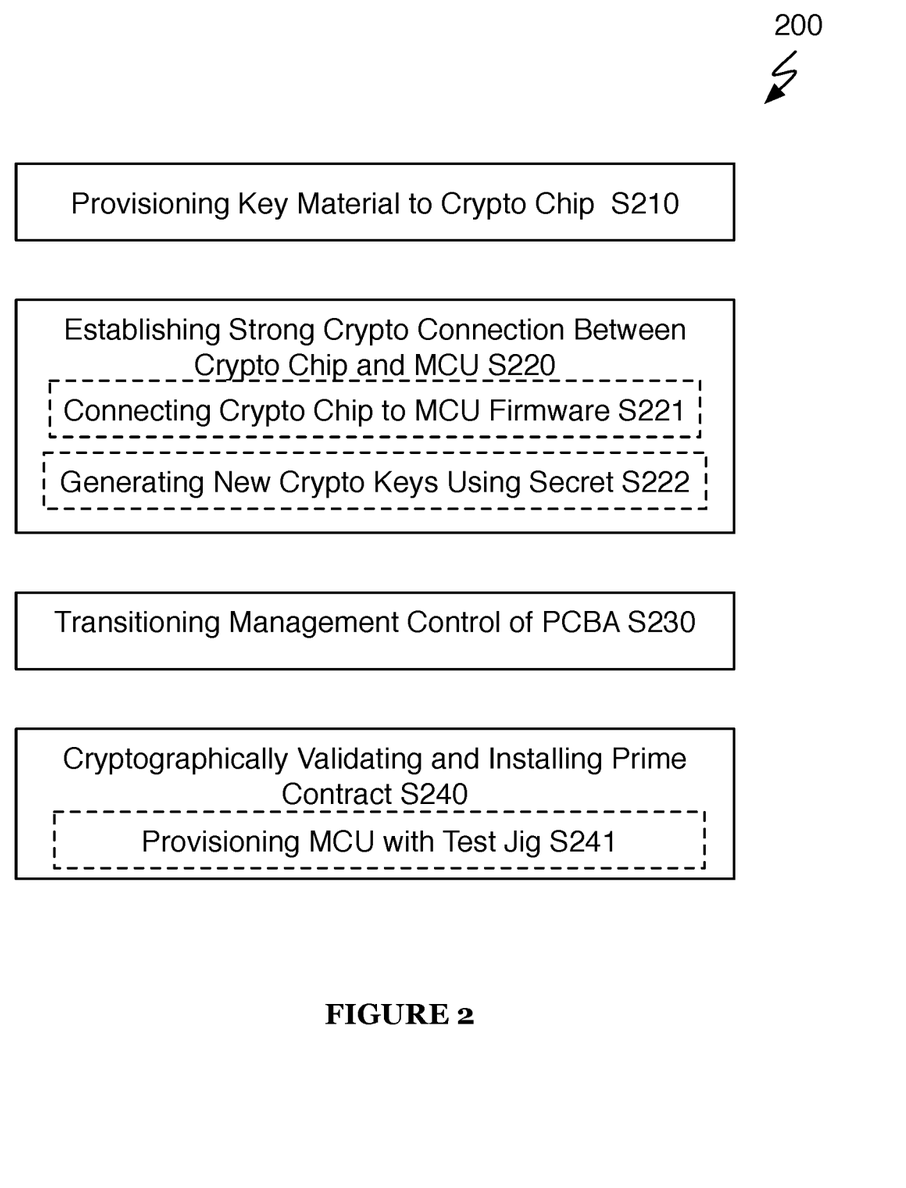
FIG. 2 illustrates a method in accordance with some embodiments of the present application.

As shown in FIG. 2, the method 200 for cryptographically securing an autonomous device includes, at a physically secure location, provisioning a cryptographic key store associated with a cryptographic chip with cryptographic key material S210 (first binding); establishing a cryptographic connection between a main central processing unit (MCU) and a cryptographic chip (crypto chip) of a printed circuit board assembly (PCBA) S220 (second binding); transitioning management control of the PCBA of the autonomous device from a first provisioning source to a second provisioning source by generating an asymmetric private/public cryptographic key pair for the second provisioning source using a master cryptographic key of the first provisioning source S230 (third binding), and cryptographically validating and installing primary operating instructions (e.g., prime contract) onto the MCU S240 (fourth binding).

The method 200 functions to cryptographically secure hardware components of an autonomous device together with the application stack (e.g., software, scripts, instructions, etc.) and protocols that are provisioned to the hardware. Preferably, the method 200 is performed in a physically secure manner and prior to the autonomous device coming online (e.g., being capable of being connected to or accessed by other devices or users). Accordingly, a strong cryptographic security envelope is created around the primary components, as well as the primary applications and protocols added to the device before any outside influence from other devices and/or possible malicious opportunist seeking to attack the autonomous device.

Therefore, the method 200 is preferably performed at a time of manufacture while the physical handling and fabrication of the printed circuit board assembly including the installation, provisioning, and initialization of the MCU and the crypto chip occurs under the care of a single handler (e.g., the manufacturer of the device and/or printed circuit board assembly) or possibly, limited to two handlers including the manufacturer and a customer scheduled to receive shipment of the autonomous device.

Thus, the method 200 enables a systematic establishment of strong cryptographic links between components of the physical circuit board assembly, between the components of the physical circuit board assembly and provisioners (or handlers) of the components of the printed circuit board, and between the operational software applications/protocols and the components of the physical circuit board assembly. Each of the respective cryptographic links created by the method 200 form a strong cryptographic chain with cryptographic links formed between the MCU and crypto chip extending to the application stack operating on the printed circuit board assembly of the autonomous device.

2.1 First Cryptographic Binding

S210, which includes provisioning a cryptographic chip and/or an associated cryptographic key store with cryptographic key material, functions to establish a first strong cryptographic binding (first link) between a first provisioning source (e.g., crypto chip manufacturer and/or provider) and the crypto chip. The provisioning of the cryptographic chip and/or the associated cryptographic key store with cryptographic key material is preferably performed by a provisioning computer at a secured facility of an initial provisioning source, such as a manufacturer of the crypto chip or the like. Sufficiently securing the facility at which the provisioning of the crypto chip is performed further ensures that the printed circuit board assembly and the crypto chip are free from physical tampering to further safeguard against possible malicious attacks against an autonomous device in which the PCBA including the crypto chip is installed.

The cryptographic key material provisioned to the crypto chip may include asymmetric cryptographic key material (e.g., private/public key pairs, public keys of a private/public key pair, and the like), symmetric cryptographic key material (e.g., shared secrets or shared public keys), and the like that may be used in one or more secure connection and/or communication processes involving the crypto chip and/or MCU and possibly a third component or application. The cryptographic key material preferably includes a master cryptographic key that enables the first provisioning source to have sole and complete management and operational control of the crypto chip. That is, using the master cryptographic key, only the first provisioning source is capable of booting and/or initializing the crypto chip, as well as generally operating the crypto chip. In this way, the crypto chip is initially only bound to the first provisioning source, via the master cryptographic key, in a very cryptographically strong and secure manner that does not allow other parties (without the master cryptographic key) to interfere with the provisioning of the crypto chip.

In a preferred embodiment of the present application, the master cryptographic key is a single-purpose or limited-purpose cryptographic key. For instance, in some embodiments, a single purpose of the master cryptographic key may be for the initialization and/or booting of the crypto chip, which may include provisioning the private and public keys necessary for further communications, connections, and operations of the crypto chip outside of the management or control of the first provisioning source. Additionally, the first provisioning source or a second provisioning source may use a master cryptographic key to perform a crypto check of the cryptographic signature(s) used for pairing the crypto chip to the MCU, as explained in more detail in step S220-S221. In such instance, the first provisioning source verifies that the cryptographic signature available to or that signed the resident firmware of the MCU matches the cryptographic signature of the master crypto key at the crypto chip. Accordingly, the crypto check may function to validate that a same master cryptographic key was used to initialize and/or provision the MCU and the crypto chip. Additionally, or alternatively, an end user or customer (e.g., second provisioning source) receiving the autonomous devices can co-sign the firmware for enhanced control and security.

As mentioned above, the cryptographic key material provisioned to the crypto chip, in addition to key material associated with the master cryptographic key, may include cryptographic key material for establishing and maintaining an operation or control connection and communication connection with an MCU of a printed circuit board assembly, interacting with a second provisioning source computer, interacting with other components of the printed circuit board (e.g., radio frequency transmitter, RNG, etc.), and the like.

Some of the cryptographic key material provisioned to the crypto chip is preferably intended for use by and/or to be used in communications with the second provisioning source (e.g., a second manufacturer and/or end user of the autonomous device). For instance, the first provisioning source may provide one or more asymmetric cryptographic keys (e.g., public keys) and/or symmetry cryptographic keys (e.g. shared crypto key) that enables the second provisioning source to authenticate to the crypto chip and/or the MCU of the device. Thus, several private/public key pairs may be stored at the crypto chip or associated key store for purposes of enabling a transfer or generation of new private/public key pairs that may be used for the control and/or operation of the MCU, crypto chip, and/or the overall control or operation of the autonomous device.

2.2 Second Cryptographic Binding

S220, which includes establishing a cryptographic connection, pairing, or link between a main central processing unit (MCU) and a cryptographic chip (crypto chip) of a printed circuit board, functions to establish a second strong cryptographic binding (second link) between the MCU and the crypto chip. Preferably, when the cryptographic chip and the MCU are joined together onto the circuit board, a first provisioning source serves to cryptographically connect and/or establish a relationship between the crypto chip and the MCU. In this way, the second strong cryptographic binding serves to ensure secure on-circuit board communication (e.g., intra-circuit board connection and communication) between the crypto chip and MCU and possibly, between the MCU and other components of the circuit board thereby limiting the possibilities of potential disruptive attacks to the main processing components of the circuit board.

A substep S221 of S220 preferably includes establishing connectivity and/or communication between the crypto chip and the MCU by establishing a connection between an application or firmware residing locally on the MCU and the crypto chip. The MCU preferably includes resident firmware specifically designed to establish the connection between the MCU and the crypto chip and further, enables further decisioning processes of the MCU. In particular, the firmware may be stored in a storage device (e.g., flash memory or the like) of the MCU and once, the crypto chip is joined to the printed circuit board, the joining event may trigger the crypto chip to attempt a connection with the MCU by initiating or transmitting a connection request to the firmware of the MCU.

The resident firmware of the MCU may include functionality to present a challenge to the crypto chip in response to an attempt by the crypto chip to establish a connection. Additionally, or alternatively, the crypto chip may present a challenge request to the MCU. In such instances, the challenge request may be included with the connection or pairing request made by the crypto chip at the time of joining the PCBA. The challenge to the crypto chip would serve to validate the identity and/or authority of the crypto chip to connect with the MCU and additionally, or alternatively, provision the MCU. Thus, the challenge to the crypto chip may include a request to provide a cryptographic signature of a master cryptographic key, and particularly, the crypto master key used to initialize and operate the crypto chip. In response to the challenge, the crypto chip may transmit, in a secure fashion, a copy or proof of a signature of the master crypto key used in its provisioning. Upon receipt by the MCU, the resident firmware may compare the cryptographic signature received from the crypto chip to a cryptographic signature of a master key used to cryptographically sign the resident firmware of the MCU. If the resident firmware determines a match between the received crypto signature and the crypto signature that signed the firmware, then the resident firmware may confirm the crypto chip's request to establish a permanent connection and/or communication channel ("pairing") between the crypto chip and the MCU.

The connection and/or communication between the crypto chip and the MCU may additionally be made cryptographically secure.

Rather than waiting to receive a connection request from an installed crypto chip, the resident firmware of the MCU may, additionally, or alternatively, initiate a connection attempt with the crypto chip once the resident firmware detects that the crypto chip has been installed and/or is available to make a connection. In this regard, the resident firmware of the MCU may transmit together with a connection request, a challenge (similar to the above-described challenge), to the crypto chip and await a response.

Once a connection and/or communication channel is established between the crypto chip and the MCU, S222 includes, triggering a shared cryptographic secret (e.g., symmetric crypto key) between the crypto chip and the MCU to create instructions for generating one or more new private/public key pairs for provisioning the MCU.

In a variation of a preferred embodiment, the functionality of the MCU and crypto chip may be combined into a single component or unit. When the functionalities of the crypto chip and MCU are combined, it may only be necessary to perform the initial strong cryptographic binding between the first provisioning source and the combined unit and possibly, not the subsequent second binding of the MCU and crypto chip since it is likely that the combined unit may be sufficiently integrated such that additional internal bindings are not required.

2.3 Third Cryptographic Binding

S230, which includes transitioning management control of the crypto chip and/or overall printed circuit board from a first provisioning source to a second provisioning source (e.g., second manufacturer or the like) by generating one or more asymmetric private/public cryptographic key pairs for the second provisioning source using a master cryptographic key of the first provisioning source, functions to establish a third strong cryptographic binding (third link) between the crypto chip/MCU pair and the second provisioning source. Effectively, the newly generated private/public key pair comprises a new (second) master cryptographic key that is accessible and useable only by the second provisioning source. Once the second master crypto key is generated and made available to the second provisioning source, the second master crypto key serves to completely replace and/or disable the functionality of the first master crypto key of the first provisioning source. For instance, instructions associated with the first master crypto key may require that once a second master crypto key is generated (triggering event), the first master crypto key must be disabled or otherwise destroyed (triggered action). In this way, management and/or operational control of the main central processing unit, other components of the printed circuit board, and consequently, the autonomous device, shifts from the first provisioning source to the second provisioning source.

Preferably, the second master crypto key of the second provisioning source has broader and more management and operational control powers than the single or limited-purpose master crypto key of the first provisioning source. For instance, the second master crypto key may allow the second provisioning source to configure and access primary data storage components of the autonomous device. The primary data storage components may include those data storage components used to collect and store operational data associated with the in-field use of the autonomous device. In many embodiments, the single or limited-purpose of the first master crypto key prevents the first master crypto key from being used in such a manner.

2.4 Fourth Cryptographic Binding

S240, which includes cryptographically validating and installing primary operational application or operating instructions (e.g., a prime contract) onto the MCU, functions to establish a fourth strong cryptographic binding (fourth link) between the MCU and the prime operational application. At the second provisioning source, the MCU may be configured to receive provisioning via one or more test jigs (e.g., testing and provisioning computers). However, prior to accepting instructions or provisions from a test jig of the second provisioning source, the MCU may first verify the testing jig's authority to test and/or provision the MCU.

Accordingly, a testing jig attempting to provision the MCU with operational instructions and/or other instructions/applications may initially make a provisioning request to the MCU. In response, the MCU may present a challenge or the like to identify and/or verify an authority of the test jig to perform any operations on the MCU including provisioning and/or modifying the MCU. The challenge preferably includes requesting a cryptographic signature and/or approval of the second master crypto key of the second provisioning source. If the test jig is able to provide a crypto signature and/or approval of the second master crypto key to the MCU, the MCU may establish a connection between itself and the test jig and further, allow the test jig to perform various operations on the MCU. Additionally, and/or alternatively, the provisioning request from the test jig may include the crypto signature and/or approval of the second master crypto key and thus, the MCU may be able to validate the test jig without necessarily presenting a challenge or the like or making a request for additional information.

Substep 241 includes, provisioning the MCU using an approved test jig (e.g., having cryptographic authority via the second master crypto key). The approved test jig may generally function to provision the MCU with primary operational instructions and cryptographic key pairs (e.g., prime digital smart contract) (described in U.S. patent application Ser. No. 15/345,414, which is incorporated herein by reference in its entirety) that generally, identifies grants, rights, and privileges and govern the in-field operations of the autonomous device. The prime operating instructions may generally be defined with self-enforcing digital objects that define rights and responsibilities of the first provisioning source and the second provisioning source (e.g., end user or customer).

At the time of provisioning the MCU with the prime operating instructions, both the MCU of the autonomous device and the test jig may cryptographically sign the prime operating instructions thereby creating the fourth strong cryptographic binding between the MCU and primary operating instructions. As a result, the firmware operating on the MCU may function to only perform actions and execute instructions of the validly signed primary operating instructions. When the autonomous device boots up, the autonomous device preferably validates the primary operating instructions by ensuring that the cryptographic signatures of the MCU and the test jig exist for the primary operating instructions.

Therefore, because the primary operating instructions include the crypto signature (which is a derivative of the second master crypto key) of the MCU, the primary operating instructions should also validate against the crypto chip having the second master crypto key. In this way, the full cryptographic chain of custody from the crypto chip to the primary operating instructions is validly maintained.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system 100 and one or more portions of the processors and/or the controllers of the system 100. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various provisioning sources, the various main processing units, the various cryptographic processors and chips, and the various test jigs and provisioning computers.

As a person skilled in the art will recognize from the previous detailed description and from the figures and claims, modifications and changes can be made to the preferred embodiments of the invention without departing from the scope of this invention defined in the following claims.

What is claimed is:

1. A system that cryptographically secures components of a printed circuit board assembly of a device, the system comprising:
    a printed circuit board assembly comprising:
        a main central processing circuit,
        a cryptographic processing circuit, and
        a physically secured cryptographic key store;
    a first provisioning source comprising a first provisioning computer that, at a time of manufacture:
        [1] provisions the main central processing circuit with resident firmware; and
        [2] cryptographically signs the resident firmware with a master cryptographic key;
        [3] provisions the physically secured cryptographic key store with asymmetric cryptographic key material,
        wherein, after provisioning the main central processing circuit and provisioning the physically secured cryptographic key store, establishing a first cryptographically secured communication channel between the main central processing circuit and the cryptographic processing circuit using the asymmetric cryptographic key material,
        wherein the main central processing circuit implements a cryptographic validation of the resident firmware by validating a cryptographic digital signature ascribed by the first provisioning source to the resident firmware against an up-to-date cryptographic signature used for installing new resident firmware or updating the resident firmware of the main central processing circuit; and
        wherein the main central processing circuit uses the first cryptographically secured communication channel to control an operation of the cryptographic processing circuit.

2. The system according to claim 1, wherein
the asymmetric cryptographic key material comprises a plurality of public cryptographic keys that are derived from the master cryptographic key of the first provisioning source.

3. The system according to claim 1, wherein
the asymmetric cryptographic key material comprises a plurality of private/public cryptographic key pairs that are derived from the master cryptographic key of the first provisioning source.

4. The system according to claim 1, wherein
the main central processing circuit, via the first cryptographically secured communication channel, controls the cryptographic processing circuit to implement a secure operation of an autonomous radio communication device.

5. A method that cryptographically secures components of a printed circuit board assembly of a device, the method comprising:
    manufacturing a printed circuit board assembly comprising:
        a main central processing circuit,
        a cryptographic processing circuit, and
        a physically secured cryptographic key store;
    at a time of manufacturing the printed circuit board assembly, using a first provisioning computer to:
        [1] provision the main central processing circuit with resident firmware; and
        [2] cryptographically sign the resident firmware with a master cryptographic key;
        [3] provision the physically secured cryptographic key store with asymmetric cryptographic key material,
    after provisioning the main central processing circuit and provisioning the physically secured cryptographic key store, establishing a first cryptographically secured communication channel between the main central processing circuit and the cryptographic processing circuit using the asymmetric cryptographic key material,
    wherein the main central processing circuit uses the first cryptographically secured communication channel to control an operation of the cryptographic processing circuit; and
    wherein the main central processing circuit implements a cryptographic validation of the resident firmware by validating a cryptographic digital signature ascribed by the first provisioning computer to the resident firmware against an up-to-date cryptographic signature used for installing new resident firmware or updating the resident firmware of the main central processing circuit.

6. The method according to claim 5, wherein
establishing the first cryptographically secured communication channel includes:
    at the main central processing circuit, receiving a secure pairing request from the cryptographic processing circuit;
    in response to receiving the secure pairing request, providing a cryptographically signed response to the cryptographic processing circuit;
    at the cryptographic processing circuit, validating the cryptographically signed response based on a cryptographic key derived from the master cryptographic key of the first provisioning computer.

7. The method according to claim 6, further comprising:
if the cryptographic processing circuit successfully validates the cryptographically signed response from the main central processing circuit, initiating an encrypted cryptographic key exchange, wherein the encrypted cryptographic key exchange includes:
    using the cryptographic key material to generate at the cryptographic processing circuit an asymmetric cryptographic key pair comprising a private/public cryptographic key pair; and transmitting from the cryptographic processing circuit to the main central processing circuit a public cryptographic key of the private/public cryptographic key pair, wherein the public cryptographic key is used by the main central processing circuit in future communications with the cryptographic processing circuit.

8. The method according to claim 7, further comprising:
at the main central processing circuit, using the public cryptographic key to communicate with or control operations of the cryptographic processing circuit.

9. The system according to claim 1, further comprising:
a second provisioning source comprising a second provisioning computer that provisions the main central processing circuit with primary operating instructions only after the main processing circuit cryptographically validates an authority of the second provision computer to provision the main central processing circuit.

10. The method according to claim 5, further comprising:
generating by the main central processing circuit an encrypted file system on a flash memory, wherein the encrypted file system operates to encrypt data stored on the flash memory that is at rest.

11. The method according to claim 5, wherein
the master cryptographic key comprises a single-purpose cryptographic key, wherein the single-purpose cryptographic key operates to initialize or boot the cryptographic processing circuit.

12. The method according to claim 5, wherein
the master cryptographic key comprises a limited-purpose cryptographic key, wherein the limited-purpose cryptographic key operates to:
 (i) initialize or boot the cryptographic processing circuit and
 (ii) implement the cryptographic validation of the resident firmware of the main central processing circuit.

13. The method according to claim 5, wherein
the asymmetric cryptographic key material comprises a plurality of public cryptographic keys that are derived from the master cryptographic key of the first provisioning source.

14. The method according to claim 5, wherein
the asymmetric cryptographic key material comprises a plurality of private/public cryptographic key pairs that are derived from the master cryptographic key of the first provisioning source.

15. The method according to claim 5, wherein
the main central processing circuit, via the first cryptographically secured communication channel, controls the cryptographic processing circuit to implement a secure operation of an autonomous radio communication device.

16. The method according to claim 5, further comprising:
transitioning management control of the printed circuit board assembly from a first provisioning source to a second provisioning source by generating a second master cryptographic key for the second provisioning source using the master cryptographic key of the first provisioning source.

17. The method according to claim 5, further comprising:
provisioning, by a second provisioning computer, the main central processing circuit with primary operating instructions only after the main processing circuit cryptographically validates an authority of the second provision computer to provision the main central processing circuit.

18. A device security method that cryptographically secures a computing components of a device, the device security method comprising:
implementing a first cryptographic binding step of:
 at a physically secure location, using a master cryptographic key by a first provisioning source recognized by a cryptographic processing circuit to initialize the cryptographic processing circuit by provisioning a cryptographic key store associated with the cryptographic processing circuit of the device with cryptographic key material;
implementing a second cryptographic binding step:
 establishing a first cryptographically secured pairing between a main central processing circuit of the device and the cryptographic processing circuit of the device by exclusively exchanging one or more cryptographic keys between the cryptographic processing circuit and the main central processing circuit;
implementing a third cryptographic binding step:
 establishing a second cryptographically secured pairing between the main central processing circuit and resident firmware of the main central processing circuit, wherein the main central processing circuit implements a cryptographic validation of the resident firmware by validating a cryptographic digital signature ascribed by the first provisioning source to the resident firmware against an up-to-date cryptographic signature used for installing new resident firmware or updating the resident firmware of the main central processing circuit; and
implementing a fourth cryptographic binding step:
 generating by the first provisioning source a second master cryptographic key for a second provisioning source based on a master cryptographic key of the first provisioning source.

19. The device security method according to claim 18, wherein
the main central processing circuit, via the first cryptographically secured pairing, controls the cryptographic processing circuit to implement a secure operation of an autonomous radio-based communication device.

* * * * *